US012021320B2

(12) United States Patent
Chazelas et al.

(10) Patent No.: US 12,021,320 B2
(45) Date of Patent: Jun. 25, 2024

(54) RADIATING ELEMENT AND ASSOCIATED ANTENNA AND MANUFACTURING METHOD

(71) Applicants: THALES, Courbevoie (FR); CENTRE NATIONAL DE LA RECHERCHE SCIENTIFIQUE, Paris (FR); ECOLE SUPERIEURE DE PHYSIQUE ET DE CHIMIE INDUSTRIELLES DE LA VILLE DE PARIS, Paris (FR); SORBONNE UNIVERSITE, Paris (FR)

(72) Inventors: Jean Chazelas, Elancourt (FR); Charlotte Tripon-Canseliet, Paris (FR); Afshin Ziaei, Palaiseau (FR); Stéphane Xavier, Palaiseau (FR)

(73) Assignees: THALES, Courbevoie (FR); CENTRE NATIONAL DE LA RECHERCHE SCIENTIFIQUE, Paris (FR); ECOLE SUPERIEURE DE PHYSIQUE ET DE CHIMIE INDUSTRIELLES DE LA VILLE DE PARIS, Paris (FR); SORBONNE UNIVERSITE, Paris (FR)

( * ) Notice: Subject to any disclaimer, the term of this patent is extended or adjusted under 35 U.S.C. 154(b) by 158 days.

(21) Appl. No.: 17/777,274

(22) PCT Filed: Nov. 26, 2020

(86) PCT No.: PCT/EP2020/083448
§ 371 (c)(1),
(2) Date: May 16, 2022

(87) PCT Pub. No.: WO2021/105260
PCT Pub. Date: Jun. 3, 2021

(65) Prior Publication Data

US 2022/0407234 A1 Dec. 22, 2022

(30) Foreign Application Priority Data

Nov. 29, 2019 (FR) ...................................... 1913566

(51) Int. Cl.
*H01Q 1/36* (2006.01)
*H01F 21/02* (2006.01)
(Continued)

(52) U.S. Cl.
CPC ............... *H01Q 9/32* (2013.01); *H01F 21/02* (2013.01); *H01Q 1/368* (2013.01); *H01Q 21/0006* (2013.01)

(58) Field of Classification Search
CPC ........ H01F 21/005; H01F 5/003; H01F 21/02; H01F 41/30; H01Q 1/36; H01Q 9/32; H01Q 1/368; H01Q 21/0006
See application file for complete search history.

(56) References Cited

U.S. PATENT DOCUMENTS 3,453,618 A 7/1969 Ukmar et al.
2002/0084410 A1* 7/2002 Colbert ................ C01B 32/174
(Continued)

FOREIGN PATENT DOCUMENTS

CN 105 914 201 A 8/2016

OTHER PUBLICATIONS

Brun, et al., "Monopole antenna based on carbon nanotubes", 2013 IEEE MTT-S International Microwave Symposium Digest (MTT), 2013.

*Primary Examiner* — Thai Pham
(74) *Attorney, Agent, or Firm* — BakerHostetler

(57) ABSTRACT

A radiating element of an antenna includes at least one wire-like nanostructure, each wire-like nanostructure extending in the same direction, called common direction, between a first end and a second end, and an inductor
(Continued)

connected to each first end of a nanostructure, the inductor being formed from a first conductive material, the inductor extending in a plane normal to the common direction, the first conductive material having an electrical conductivity that varies under the effect of a variation of an electric field applied within the first conductive material.

13 Claims, 7 Drawing Sheets

(51) Int. Cl.
*H01Q 9/32* (2006.01)
*H01Q 21/00* (2006.01)

(56) References Cited

U.S. PATENT DOCUMENTS

| | | | | |
|---|---|---|---|---|
| 2005/0116861 | A1* | 6/2005 | Anazawa | H01Q 1/368<br>343/700 MS |
| 2009/0251267 | A1* | 10/2009 | Jeon | H01F 17/0006<br>336/200 |
| 2009/0251371 | A1* | 10/2009 | Burke | H04B 1/38<br>455/39 |

* cited by examiner

RADIATING ELEMENT AND ASSOCIATED ANTENNA AND MANUFACTURING METHOD

CROSS-REFERENCE TO RELATED APPLICATIONS

This application is a National Stage of International patent application PCT/EP2020/083448, filed on Nov. 26, 2020, which claims priority to foreign French patent application No. FR 1913566, filed on Nov. 29, 2019, the disclosures of which are incorporated by reference in their entirety.

FIELD OF THE INVENTION

The field of the invention is that of microwave devices, such as network antennas.

BACKGROUND

Such devices may be used in various applications such as radar applications in avionics and aerospace, high-rate communications, space technologies.

An antenna array is composed of a two-dimensional array of radiating elements.

SUMMARY OF THE INVENTION

The present invention relates to a radiating element, an antenna including such a radiating element and a method for manufacturing such a radiating element.

Many types of antennas exist which vary according to the applications targeted, for example depending on the wavelength and on the power, or else on the desired spectral characteristics of the emission. In particular, numerous types of antennas include an assembly of radiating elements, also referred to as elementary antennas. The radiating elements allow, by the design of their layout, of their geometry or by controlling the electrical signal which supplies each of them, the gain of the antenna to be improved or its directivity or the shape of the emitted beam to be controlled.

However, the existing antennas have relatively large dimensions, of the order of several centimeters to several tens of centimeters depending on the frequency and on the power required by the targeted application, and hence a large volume and weight. The large dimensions are an issue for some applications, for example for mobile devices, since this results in an increase in the volume and/or in the weight of the devices. Furthermore, the devices containing wide antennas are more difficult to carry. The integration of antennas into devices whose geometry is fixed by functions other than communications is, furthermore, made difficult.

There is accordingly a need for a radiating element that is smaller than the radiating elements of the prior art.

For this purpose, a radiating element is provided for an antenna including an assembly of at least one wire-like nanostructure, each wire-like nanostructure extending in the same direction, referred to as common direction, between a first end and a second end. The radiating element also includes an inductor connected to each first end of a nanostructure, the inductor being formed from a first conductive material, the inductor extending in a plane normal to the common direction. According to the invention, the first conductive material has an electrical conductivity varying under the effect of a variation of an electric field applied within the first conductive material.

Advantageously, the inductor is configured so as to have an inductance value that may be matched with a capacitance of the assembly of at least one wire-like nanostructure.

Advantageously, the first conductive material includes a semi-metal.

The first material is, for example, graphene, or a transition metal dichalcogenide.

Advantageously, at least one wire-like nanostructure is a carbon nanotube.

Advantageously, the assembly of at least one wire-like nanostructure includes several wire-like nanostructures.

Advantageously, each wire-like nanostructure has an aspect ratio greater than 20.

Advantageously, the inductor has a spiral shape.

Advantageously, the assembly of at least one wire-like nanostructure includes several wire-like nanostructures.

Advantageously, in the latter case, the inductor is configured so as to have an inductance value that may be matched with a capacitance of the assembly of wire-like nanostructures.

The invention also relates to an elementary antenna including a first radiating element according to the invention. The antenna also includes a transmission line including a region made of a second conductive material and two ground planes, the transmission line extending in the same plane as the inductor and the region being connected to the inductor, each ground plane being made of a third conductive material, the zone being arranged between the two ground planes. According to the invention, the antenna includes a variable DC voltage generator capable of applying the electric field within the first conductive material.

As the DC voltage generator is a variable DC voltage generator, the DC voltage generator is capable of applying a variable electric field within the first conductive material.

Advantageously, the elementary antenna includes an electrode in physical contact with the inductor, the voltage generator applying the electric field to the first conductive material by means of the electrode.

The invention also relates to an antenna array. It includes an array of several radiating elements according to the invention. In other words, it includes several elementary antennas according to the invention arranged such that the radiating elements of the various elementary antennas form an array of radiating elements.

Advantageously, the inductors of the radiating elements are coplanar or capable of being coplanar.

The antenna array includes, for example, several radiating elements of which a first radiating element is according to the invention and a second radiating element is according to the invention, the first radiating element and the second radiating element having assemblies of at least one wire-like nanostructure having different capacitances.

BRIEF DESCRIPTION OF THE DRAWINGS

Features and advantages of the invention will become apparent upon reading the description that follows, presented by way of non-limiting example, and with reference to the appended drawings, in which.

From one figure to another, the same elements are identified by the same references.

DETAILED DESCRIPTION

Figure 1:
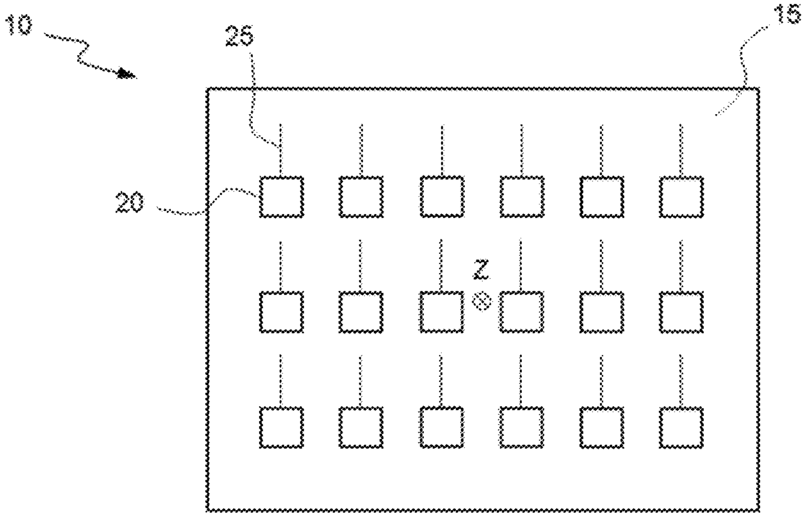
FIG. 1 is a diagram of an antenna including an assembly of radiating elements and an assembly of transmission lines.

An antenna 10 is shown in FIG. 1.

The antenna 10 is configured for emitting and/or receiving a set of electromagnetic waves. For example, the antenna 10 is configured for emitting and for receiving a set of electromagnetic waves.

The electromagnetic wave has a frequency in the range between 3 kiloHertz (KHz) and 300 gigaHertz (GHz). It should be noted that the frequency of the electromagnetic wave can vary according to the applications envisioned for the antenna 10.

The antenna 10 includes a substrate 15, radiating elements 20 and transmission lines 25.

According to the example in FIG. 1, the antenna 10 includes a transmission line 25 for each radiating element 20.

As a variant, the antenna 10 includes a single radiating element 20 and a single transmission line 25.

The antenna 10 includes, furthermore, an electrical ground such as a metal chassis. As a variant, the electrical ground is an electrical circuit connected to earth.

The substrate 15 is provided to carry the radiating elements 20 and the transmission lines 25.

The substrate 15 has a carrier face 30.

The carrier face 30 is plane.

A normal direction Z is defined as being the direction perpendicular to the carrier face 30. The axis Z is also defined by the direction Z and oriented in the direction of the substrate toward the radiating elements.

The substrate 15 includes a carrier plate 35 and a buffer layer 40.

The carrier plate 35 is configured so as to serve as a carrier for the buffer layer 40, for the radiating elements 20 and for the transmission lines 25.

The carrier plate 35 is, for example, made of silicon. According to a variant, the carrier plate 35 is made of alumina.

The carrier plate 35 has, for example, a thickness in the range between 200 micrometers (μm) and 500 μm.

The carrier plate 35 is made of a material having an electrical resistivity. The electrical resistivity is, for example, greater than or equal to 10000 Ohm·centimeter. Such an electrical resistivity allows the radiofrequency losses in the carrier plate 35 to be limited.

It should be noted that a material other than silicon could be used for the carrier plate 35. The buffer layer 40 is interposed between, on the one hand, the carrier plate 35 and, on the other hand, the radiating elements 20 and the transmission lines 25.

The buffer layer 40 is bounded in the normal direction Z by the carrier plate 35 and by the carrier face 30.

The buffer layer 40 is made of an electrically insulating material. The buffer layer 40 is, for example, made of silicon oxide.

The buffer layer 40 has a thickness, in the normal direction Z, in the range between 500 nanometers and 5 micrometers. For example, the thickness of the buffer layer 40 is equal to 2 micrometers.

Figure 2:
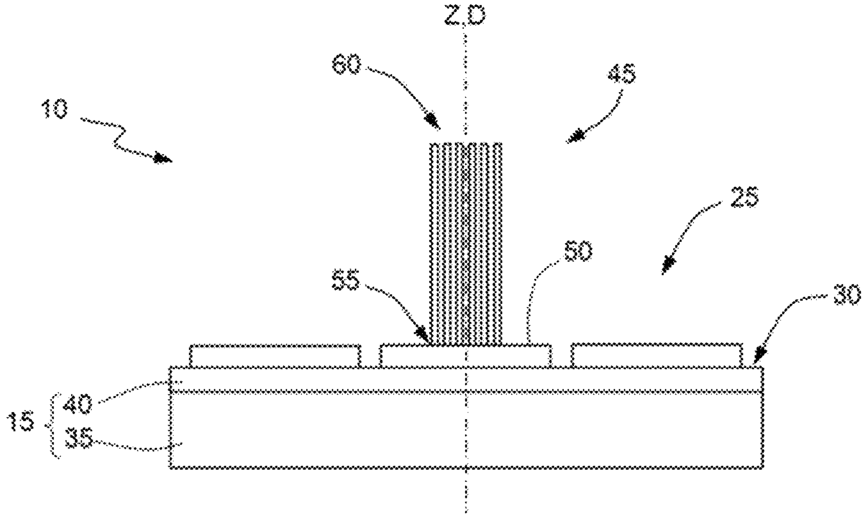
FIG. 2 is a cross-sectional view of a radiating element of the invention and of a transmission line in FIG. 1, the radiating element including a bundle of nanostructures.

A cross-sectional view of a radiating element 20 in a plane parallel to the normal direction Z is shown in FIG. 2.

Each radiating element 20 is configured for emitting and/or receiving an electromagnetic wave.

Each radiating element 20 includes a bundle F of nano-structures 45 and an inductor 50.

The bundle F includes at least ten nanostructures 45.

The bundle includes, for example, thousands or millions of nanostructures 45.

As a variant, the radiating element 20 includes a single nanostructure 45.

The term "nanostructure" is understood to mean a structure having at least one nanometer-scale dimension.

A dimension of an object, measured in a given direction, is the distance between the two points of the object furthest from one another in said direction. A nanometer-scale dimension is a dimension strictly less than 1 micrometer, preferably strictly less than 100 nanometers.

A direction D is defined for each nanostructure 45. This means that each nanostructure 45 extends in the direction D defined for the nanostructure 45 in question.

The direction D of each nanostructure 45 is parallel to the normal direction Z.

Each nanostructure 45 has a first end 55 and a second end 60. Each nanostructure 45 extends between the first end 55 and the second end 60.

The direction D is, for example, parallel to the normal direction Z.

The direction D is common to all the nanostructures 45 of the same radiating element 20.

A diameter measured in a plane perpendicular to the direction D is defined for each nanostructure 45, The diameter of each nanostructure 45 is in the range between 2 nanometers (nm) and 10 nm.

The length of each nanostructure 45 is in the range between 300 μm and 1 millimeter (mm). In particular, the length of each nanostructure 45 is greater than or equal to 500 μm.

The length of each nanostructure 45 is measured in the common direction D.

Each nanostructure 45 is a nanowire. A wire-like structure is a structure having a length strictly greater than 10 times the diameter. The ratio between, in the numerator, the length and, in the denominator, the diameter, is called "aspect ratio", also referred to as form factor.

Advantageously, each nanostructure 45 is such that the aspect ratio is strictly greater than 20.

Nanotubes are examples of nanowires 45. Nanotubes are hollow wire-like structures having a diameter below 100 nanometers.

In other words, a nanotube is a hollow nanowire.

A “bundle” is understood to mean an assembly of nanostructures 45 in which the nanostructures 45 are separated from one another by a distance less than or equal to the length of the nanostructures 45. The distance between the nanostructures 45 is measured in a plane perpendicular to the common direction D.

According to particular cases, the distance is less than or equal to half the length, for example less than or equal to a fifth of the length, in particular less than or equal to a tenth of the length.

According to one embodiment, a median value is defined for the length of the nanostructures 45 of the same bundle F. The median value is a value such that half of the nanostructures 45 of the bundle F in question have a length greater than or equal to the median value, the other half having a length less than or equal to the median value.

The lengths of the nanostructures 45 of the bundle in question vary between 50 percent (%) and 150% of the median value.

The median value is, for example, greater than or equal to five hundred micrometers.

A total length is defined for the bundle F. The total length is, for example, defined as being the longest length of the nanostructure 45 from amongst all of the nanostructures 45 belonging to the bundle F.

The total length is, for example, identical for each bundle F.

According to one embodiment, the total lengths of at least two bundles F are different from one another.

The bundle has an envelope common to all the nanostructures. An “envelope” is understood to mean a surface encompassing the nanostructures 45 and tangent to the nanostructures 45 which bound the bundle F in a plane perpendicular to the common direction D.

A maximum lateral dimension is defined for the envelope. The maximum lateral dimension is the largest dimension of the envelope in a plane perpendicular to the common direction D. The maximum lateral dimension is in the range between 10 μm (or 20 μm) and 1 mm.

An aspect ratio equal to the ratio between, in the numerator, the total length of the bundle F and, in the denominator, the maximum lateral dimension is defined for the bundle F.

The aspect ratio of the bundle F is, for example, in the range between 5 and 15. According to one embodiment, the aspect ratio of the bundle F is less than or equal to 10. It is, for example, in the range between 9 and 10.

The bundle F typically has a total length in the range between 100 micrometers and 1 mm and a diameter in the range between 10 micrometers and 100 micrometers.

The form factor depends on the targeted emission or reception frequency, in other words depending on the targeted resonance frequency.

In radiofrequency applications, the bundle F is advantageously configured for resonating at a frequency in the range between 1 GHz and 100 GHz.

Figure 3:
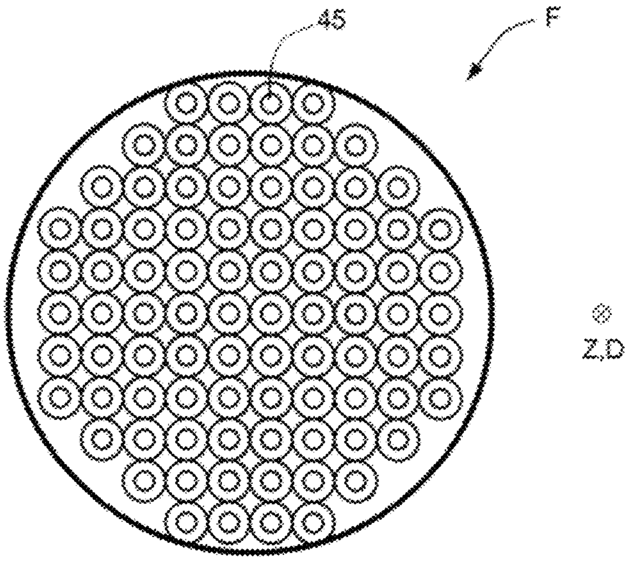
FIG. 3 is a top view of a bundle of nanostructures.

The bundle F is shown seen in the common direction Din FIG. 3.

The envelope has a cross-section transverse to the common direction D of circular shape.

It should be noted that shapes other than the circular shape may be envisioned for the cross-section of the bundle F. For example, the cross-section of the bundle F has a circular shape, or else a polygonal shape such as a rectangular or cruciform shape.

The nanostructures 45 are all made of the same material. In particular, each nanostructure 45 is a carbon nanotube.

In FIG. 3, each nanostructure 45 is a double-wall carbon nanotube. It should be noted that carbon nanotubes could be single-wall carbon nanotubes, multi-wall carbon nanotubes (or MWCNT) or else a mixture of single-wall carbon nanotubes and of multi-wall carbon nanotubes. It should be noted that other types of wire-like nanostructures 45 could be used instead of carbon nanotubes.

The carbon nanotubes are advantageously aligned vertically. In other words, the carbon nanotubes extend longitudinally in the same direction D.

It should be noted that other types of wire-like nanostructures 45 could be used instead of carbon nanotubes.

For example, the nanostructures 45 are nanowires, for example nanowires of silicon or of another semiconductor material.

According to another variant, the nanostructures 45 are made of an electrically conductive material such as a metal material.

The inductor 50 of each radiating element 20 extends in a plane normal to the common direction D. Each inductor 50, for example, takes the form of a conducting layer carried by the substrate 15. For example, each inductor 50 is perpendicular to the normal direction Z and to the common direction D. In particular, the inductor 50 is carried by the buffer layer 40.

The inductor 50 is composed of a first conductive material.

Figure 4:
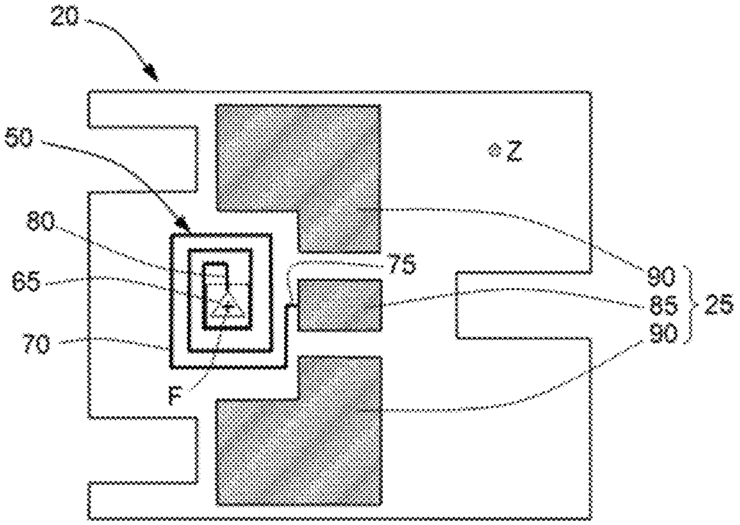
FIG. 4 is a top view of the radiating element and of the transmission line in FIG. 2.

According to the example in FIG. 4, each inductor 50 includes a first portion 65 and a second portion 70.

The first portion 65 extends in a plane perpendicular to the normal direction Z.

The first portion 65 is interposed between the bundle F of nanostructures 45 and the substrate 15. The first portion 65 is connected to the first end 55 of each nanostructure 45.

The first portion 65 has a triangular shape in a plane normal to the common direction D.

It should be noted that shapes other than triangular shapes may be envisioned for the first portion 65. For example, the first portion 65 has a circular or square shape. The second portion 70 extends in a plane perpendicular to the normal direction Z.

A maximum dimension is defined for the second portion 70. The maximum dimension is measured in a plane perpendicular to the normal direction Z between the two points of the second portion 70 furthest from one another.

The maximum dimension 70 is in the range between 100 μm and 1 mm. For example, the maximum dimension 70 is in the range between 200 μm and 500 μm. It should be noted that the maximum dimension 70 is able to vary.

The second portion 70 has a spiral shape in a plane perpendicular to the normal direction Z.

The second portion 70 surrounds the first portion 65 in a plane perpendicular to the normal direction Z.

According to one embodiment, the second portion 70 is formed by a succession of straight-line segments. For example, each straight-line segment is perpendicular to the straight-line segments with which it is contiguous.

As a variant, a curved part of the second portion 70 is interposed between two contiguous straight-line segments.

According to another variant, the second portion 70 is formed by a single curve wound around itself.

It should be noted that a second portion 70 having a shape different from a spiral may also be envisioned.

The second portion 70 has a third end 75 and a fourth end 80. The second portion 70 extends in a spiral from the third end 75 to the fourth end 80.

The third end 75 is the end of the second portion 70 which is situated on the periphery of the second portion 70 in a plane perpendicular to the normal direction Z.

The fourth end 80 is the end of the second portion 70 which is situated on the periphery of the first portion 65 in a plane 5 perpendicular to the normal direction Z. The fourth end 80 is therefore surrounded by the remainder of the second portion 70 in a plane perpendicular to the normal direction Z.

The fourth end 80 is connected to the first portion 65.

The transmission line 25 extends in the same plane as the inductor 50. In particular, the transmission line 25 takes the form of a layer carried by the substrate 15.

The transmission line 25 includes a conducting region 85 and at least one ground plane 90. In particular, the transmission line 25 shown in FIG. 4 includes two ground planes 90.

The conducting region 85 is connected to the inductor 50. For example, the conducting region 85 is connected to the third end 75 of the inductor 50.

The conducting region 85 is configured for receiving an electrical current from the inductor 50. Such a current is notably generated by the inductor 50 following the receipt of an electromagnetic wave.

The conducting region 85 is, furthermore, configured for receiving an electrical current from an electrical source external to the antenna 10 and for supplying the inductor 50 with said electrical current. The conducting region 85 has, for example, a rectangular shape.

The conducting region 85 has a thickness measured in the normal direction Z. The thickness of the conducting region 85 is in the range between 100 nanometers and 1 micrometer. For example, the thickness of the conducting region 85 is equal to 600 nanometers.

The conducting region 85 is made of a second conductive material.

The second conductive material is, for example, a metal material. The second conductive material is for example molybdenum.

According to one embodiment, the second conductive material is the same material as the first conductive material.

It should be noted that other conductive materials may be envisioned for the conducting region 85.

Each ground plane 90 is connected to the ground of the antenna 10.

Each ground plane 90 has a thickness measured in the normal direction Z. The thickness of each ground plane 90 is in the range between 100 nanometers and 1 micrometer.

For example, the thickness of each ground plane 90 is equal to 600 nanometers.

Each ground plane 90 is made of a third conductive material.

The third conductive material is, for example, a metal material. The third conductive material is, for example, molybdenum.

According to one embodiment, the third conductive material is the same material as the first conductive material.

It should be noted that other conductive materials may be envisioned for each ground plane 90.

According to one embodiment, the conducting region 85 is arranged between the two ground planes 90.

A distance, in a plane perpendicular to the normal direction Z, between the conducting region 85 and the ground plane 90 the closest to the conducting region 85 is in the range between 50 μm and 250 μm.

In the example provided, the conducting region 85 is equidistant from the two ground planes 90.

In the example shown in FIG. 4, the inductor 50 is interposed, at least partially, between the two ground planes 90.

A distance between the inductor 50 and the ground plane or planes 90 is in the range between 20 μm and 300 μm.

According to one embodiment, each ground plane 90 has an "L-shape". Each ground plane 90 then has a first branch and a second branch, the two branches being perpendicular to each other.

The first branch of each ground plane 90 extends in the direction of the other ground plane 90 belonging to the same transmission line 25. For example, the two first branches of the same transmission line 25 are aligned with one another.

The conducting region 85 of each transmission line 25 is, for example, interposed between the two first branches to the transmission line 25 in question.

The two first branches of the same transmission line 25 are, for example, interposed between the corresponding two second branches. Each inductor 50 is, for example, interposed between the two second branches of the ground planes 90 between which the inductor 50 is interposed. For example, the inductor 50 is accommodated in a rectangular area bounded on a first side of the rectangular area by the two first branches, on a second side of the rectangular area by one of the second branches and on a third side of the rectangular area by the other second branch, the first side being perpendicular to the second side and to the third side.

The operation of the antenna 10 will now be described.

In emission mode, at least one transmission line 25 receives a first electrical current. In particular, the first electrical current is transmitted, from a device external to the antenna 10, to the conducting region 85.

The conducting region 85 transmits the first electrical current to the inductor 50 of the radiating element 20 connected to the transmission line 25 in question.

In response to the reception of the first electrical current by the inductor 50, a first electromagnetic wave is emitted by the radiating element 20.

In reception mode, a second electromagnetic wave is received by at least one radiating element 20.

Following the reception of the second electromagnetic wave, a second electrical current appears in the inductor 50 of the radiating element 20 in question. The second electrical current is transmitted by the inductor 50 to the conducting region 85 connected to the inductor 50.

The second electrical current is subsequently transmitted, via the transmission line 25 in question, to a device external to the antenna 10.

The radiating element 20 has greatly reduced dimensions. In particular, the dimensions of the radiating element 20 are smaller than the dimensions of the radiating elements of the prior art. The antenna 10 therefore has a smaller volume and lower weight than the antennas of the prior art.

In particular, the association of the nanostructure or nanostructures 45 and the inductor 50 allows the length of the nanostructures 45 to be minimized with respect to a radiating element 20 not including an inductor 50.

An aspect ratio, for the bundle F, in the range between 5 and 15 typically has a good mechanical resistance while at the same time allowing a good efficiency of conversion of the electrical current into electromagnetic waves and vice versa. An aspect ratio in the range between 9 and 10 is one example of aspect ratio particularly advantageous for obtaining a good mechanical resistance and a good conversion efficiency.

Furthermore, the length of the nanostructures 45 and the inductance value of the inductor 50, which varies as a function of the dimensions of the inductor 50, allow the radiating element 20 to be readily adapted to different values of frequency. In particular, antennas 10 having a wide emission and/or reception band are obtained when different total lengths or values of inductance are used for certain radiating elements 20.

Nanostructures 45 having a median value of length greater than or equal to 500 nanometers allow a good conversion efficiency to be obtained.

The spiral shape is a shape allowing an inductor 50 that is particularly compact, and hence a radiating element 20 of particularly reduced dimensions, to be obtained.

The use of a buffer layer 40 made of an electrically insulating material allows the radiofrequency losses to be limited during use of the radiating element 20.

An antenna 10 in which each inductor 50 is interposed at least partially between the two corresponding ground planes 90 is, here again, particularly compact.

As a reminder, the inductor 50 is formed from a first conductive material.

According to the invention, the first conductive material is chosen so as to have an electrical conductivity that varies under the effect of a variation of an electric field applied within the first conductive material, in other words within the inductor 50.

In other words, the first material has an electrically controllable electrical conductivity.

The inductor has an inductance value L which varies under the effect of the electrical conductivity of the first material and hence under the effect of the variation of the electric field applied to the first conductive material.

Thus, the inductance value varies under the effect of a variation of a voltage U1 applied between two terminals of the first material. It is the voltage U1 which generates an electric field within the inductor 50.

The first conductive material is different from a metal. Metals exhibit a fixed electrical conductivity.

The first conductive material is advantageously a semi-metal.

According to one particular embodiment, the first conductive material is graphene.

The inductor 50 includes, for example, a plurality of layers of a first conductive material or a single layer of graphene.

Advantageously, each layer of graphene is an atomic monolayer. In other words, it has a thickness of a single atom.

The inductor 50 may include only the first conductive material or may include the first material and at least one other material.

The inductor 50 includes, for example, an alternation of layers of graphene and of layers of another material.

The other material has advantageously a lower electrical conductivity than that of graphene.

The other material is, for example, graphene oxide.

It should be noted that the inductor of an element made of a predefined material includes a magnetic inductance essentially defined by the geometrical characteristics of the element and a kinetic inductance due to the motion of the electrons within the material by the voltage. By varying the voltage applied between two terminals of the element, the speed of movement of the electrons within the material, and hence its kinetic inductance, is made to vary whereas its magnetic inductor does not change.

It should be noted that the inductance of graphene exhibits a noteworthy property. The kinetic inductance of graphene is much greater than its magnetic inductance which distinguishes it from metals whose kinetic inductance is negligible.

Figure 5:
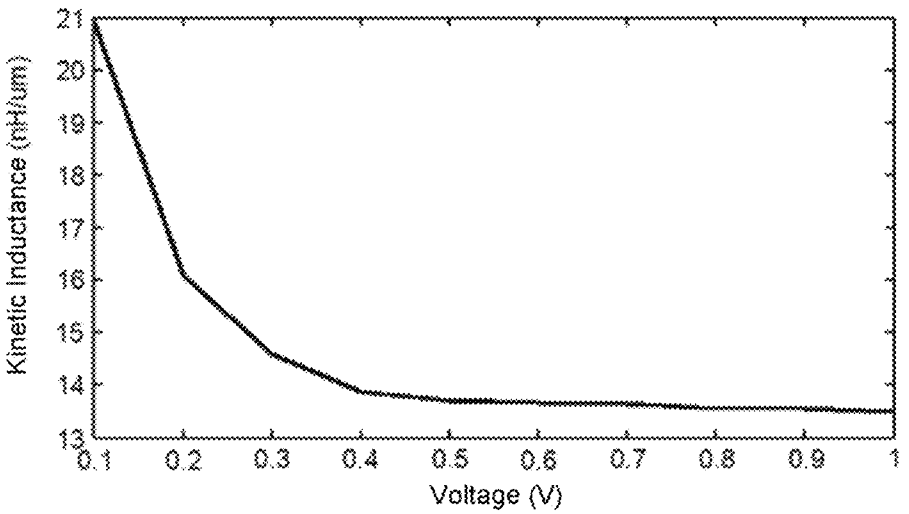
FIG. 5 shows schematically a curve of values of the kinetic inductance of an inductor formed from a plurality of mono-atomic layers of graphene as a function of a voltage applied to the terminals of the inductor.

FIG. 5 shows the kinetic inductance $L_k$ defined in $H \cdot m^{-1}$ of an inductor 50 made of graphene. This kinetic inductance decreases as a function of the voltage U1 applied between two faces of the inductor 50.

Other materials having an electrical conductivity varying as a function of the electrical voltage across the terminals of the first material may of course be envisioned.

Two-dimensional materials may be used. The first material may be a transition metal dichalcogenide (or TMD).

As a variant, the first conductive material is formed from a semi-metal or from several semi-metals.

A first topological semi-metal may, for example, be provided including the Dirac semi-metal ($Cd_3As_2$, $Na_3Bi$) and the Weyl semi-metal (TaAs, NbAs).

Each inductor 50 has a thickness measured in the normal direction Z. The thickness of the inductor 50 is in the range between 100 nanometers and 1 micrometer. For example, the thickness of the inductor 50 is equal to 600 nanometers.

Each inductor 50 has an inductance value which is adjustable by adjusting an electric field applied within the inductor, in other words by adjusting a voltage applied between two terminals of the inductor 50.

Figure 6:
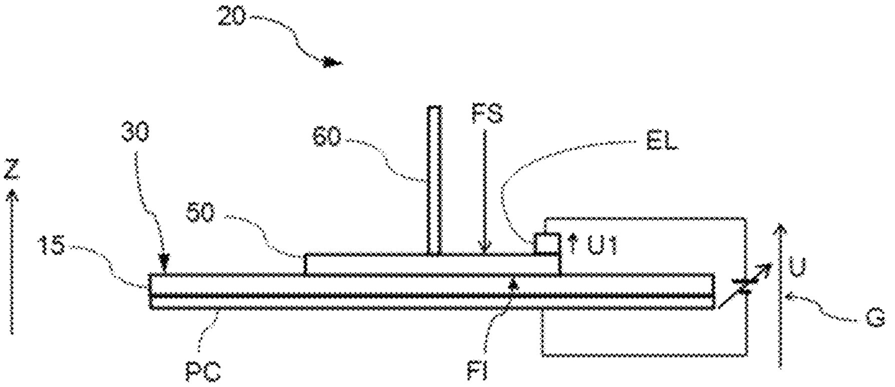
FIG. 6 shows schematically a radiating element according to the invention associated with an adjustable DC voltage generator, the radiating element including a bundle of nano-structures.

The antenna according to the invention advantageously includes, as shown in FIG. 6, a generator G of variable DC voltage allowing a DC voltage U1 to be applied between two terminals FI, FS of the inductor so as to apply an electric field E within the first conductive material 50.

The DC voltage U1 is applied such that a substantially uniform electric field E of variable value is applied within the first conductive material.

Since the electrical conductivity of the first electrically conductive material varies as a function of the electric field to which it is subjected, the electrical conductivity is adjustable by adjusting the electric field.

However, since the inductance value L of the inductor 50 varies as a function of the electrical conductivity of the first electrically conductive material, the inductance value L varies under the effect of a variation of the voltage U1, in other words of the electric field E.

The antenna advantageously includes, as seen in FIG. 6, an electrically conducting electrode EL in direct physical contact with the inductor 50.

The variable DC voltage generator G is able to apply a potential difference between the conducting electrode EL and a ground M in such a manner that the first conductive material is subjected to a substantially uniform electric field.

This electric field E extends, for example, along the axis Z as in the embodiment in FIG. 2.

The inductor 50 extends, along the axis Z, from a lower face FI in direct physical contact with the substrate 15 and, more particularly, with the carrier face 30, up to an upper face FS.

The substrate 15 is affixed to a lower conducting plate PC connected to the electrical ground. The substrate 15 is interposed, along the axis Z, between the conducting plate PC and the inductor 50.

The electrode EL is electrically conducting and is for example made of metal.

In the embodiment shown in FIG. 6, the electrode EL is deposited onto the upper face FS of the inductor 50. The inductor 50 is interposed, along the axis Z, between the substrate 15 and the lower face FI of the inductor 50.

The variable DC voltage generator is able to apply a variable DC voltage U between the electrode EL and the lower conducting plate PC such that a voltage U1 is applied between the upper face FS and the lower face DI of the inductor 50.

When a voltage U1 is applied between the upper face FS and the lower face DI, the first conductive material is subjected to an electric field E extending along the axis Z.

As a variant, the variable DC voltage generator is designed to apply a voltage between two coplanar terminals of the inductor 50 such that the first conductive material is subjected to an electric field extending in a plane perpendicular to the axis Z. A coplanar electrode and ground are then provided extending in the same transverse plane perpendicular to the axis Z as the inductor 50. The inductor is interposed between the electrode and the ground in this transverse plane in one direction of the transverse plane. The generator is designed to apply a DC voltage between the coplanar electrode and ground.

It should be noted that the resonant mode of the radiating element 20 is mainly capacitive for the bundle F of wire-like nanostructures and inductive for the inductor. A wire-like nanostructure exhibits a high resistance when it is alone, whereas a bundle F of wire-like nanostructures exhibits a very low resistance that can be as low as 50 Ohms. It then becomes essentially capacitive. The wire-like nanostructures arranged in a bundle form an element equivalent to a capacitance C. This distributed capacitance C depends on the number of nanowires, on their diameter and on the form factor.

The addition of an inductor in series with the bundle F (for example of the spiral type as seen in FIG. 4) allows a radiating element resonating at a desired frequency to be obtained.

Providing an inductor 50 having an inductance value varying as a function of the electric field to which it is subjected allows the inductance value L of the inductor 50 to be matched with the capacitance C of the bundle F of wire-like nanostructures 45, at a predetermined frequency, and thus the correct operation of the antenna to be guaranteed at this frequency.

Matching the inductance value L of the inductor 50 to the capacitance C of the bundle of wire-like nanostructures 45 at the frequency $f_0$ is understood to mean choosing the inductance value L in such a manner that the radiating element 20 is resonant at the frequency $f_0$.

When the radiating element is in the resonant mode, the resonance inductance value L is related to the frequency $f_0$ and to the capacitance C of the nanowire F via the following formula:

$$f_0 = \frac{1}{2\pi\sqrt{L*C}}$$

It should be noted that an emitting antenna is a resonant electronic circuit of the RLC type: resistive (R)-inductive (L)-capacitive (C) series or parallel, at a resonance frequency $f_0$. This circuit delivers an impedance $Z_{RLC}$ matched at the output to the impedance of the air (i.e. 377 Ohms) and, at the input, a reference impedance $Z_0$ (generally 50 Ohms). When these conditions are met, it is then possible to transmit the energy of the input signal via this circuit which is then described by an impedance corresponding to its input showing this resonance visible on its real part (close to $Z_0$) and imaginary part (equal to zero at $f_0$).

The input impedance $Z_{in}$ of the antenna is linked to the impedance $Z_{RLC}$ of the RLC circuit and to the impedance of the air $Z_{air}$ via the following formula:

$$Z_{in}=(Z_{RLC}+Z_{air})$$

with $$Z_{RLC} = R + j\left(L\omega - \frac{1}{C\omega}\right)$$

where ω=2*π*f and R is the resistance or real part of the impedance of the RLC circuit and f is the frequency, L is the inductance of the RLC circuit and C is the capacitance of the RLC circuit.

Figure 7:
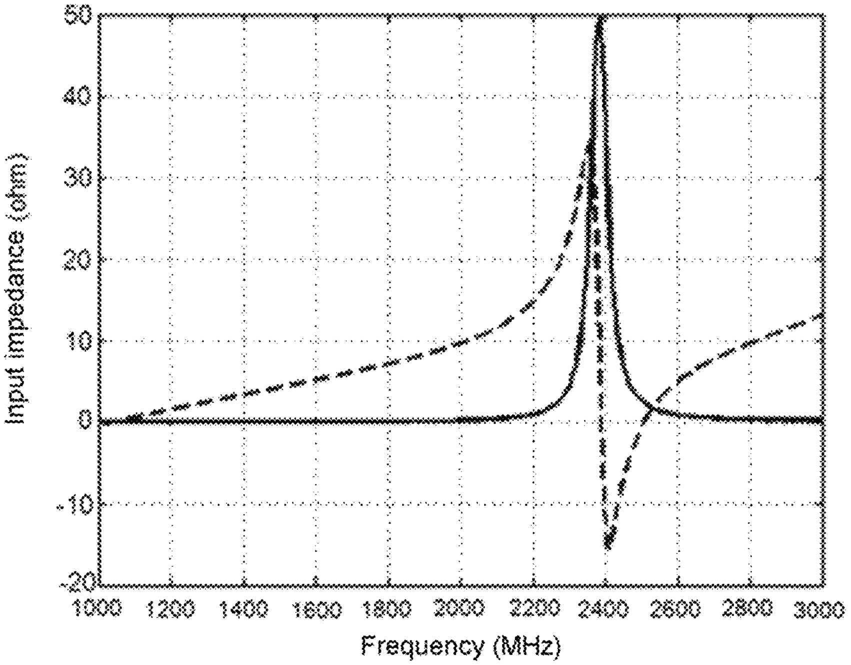
FIG. 7 shows schematically curves of real (solid line) and imaginary (dashed line) values of an input impedance of an antenna as a function of frequency.

As can be seen in FIG. 7, showing the real part of the input impedance of an antenna and the imaginary part of the input impedance of the antenna with a dashed line, at the resonance frequency, the imaginary part of the input impedance is zero and its real part is maximum.

When the real part of the input impedance is equal to 50 Ohms at the resonance frequency $f_0$, this real part is matched to a radiofrequency emission based on an input signal usually having a real part of this value. Its zero imaginary part is, for its part, matched to an emission based on the input signal usually having an imaginary part equal to zero.

The possibility of varying the inductance value of the inductor 50 allows the resonance of the radiating element 20 to be obtained even when the bundle F has, after its growth, a capacitance C which differs slightly from the capacitance sought. This solution therefore allows the gain of the antenna to be optimized by applying a voltage to the inductor 50 whose value allows the inductance value L of the inductor to be matched with the capacitance C of the bundle F.

The electric field providing the matching is advantageously applied during the operation of the antenna, in other words during the emission or the reception of a radiofrequency wave by the antenna, in order to achieve the matching at the given frequency.

The invention also relates to a method for controlling the antenna in which the first conductive material is subjected to an electric field such that the inductance value of the inductor 50 is matched with the capacitance of the bundle F at a predetermined frequency, when the antenna emits or receives an electromagnetic wave at the predetermined frequency.

In order to verify that the inductance value is matched with the capacitance of the bundle F at a predetermined frequency, it is possible to measure a coefficient of reflection of a wave emitted or received by the antenna from which the real part and the imaginary part of the input impedance of the antenna may be deduced and for example displayed. By following these impedances when the voltage is varied, for a given frequency, it is possible to deduce the value of impedance for which there is a resonance.

Advantageously, the antenna includes means for measuring a coefficient of reflection of a wave emitted or received by the antenna and processing means allowing the inductance value of an inductor to be adjusted in order to match the inductance value to the capacitance of the bundle at a predetermined frequency, based on measurements of the coefficient of reflection measured by the measurement means for various values of a DC voltage applied by the variable DC voltage generator between two terminals of the inductor 50.

The adjustment of inductance may be carried out collectively for an antenna array.

Advantageously, the antenna includes means for measuring a coefficient of reflection of a wave emitted or received by the antenna and processing means allowing the inductance values of the inductors 50 of the antenna to be adjusted in order to substantially match the values of inductances to the capacitance of the bundle at a predetermined frequency, based on measurements of the coefficient of reflection measured by the measurement means for various values of a DC voltage or of DC voltages applied by one or more variable DC voltage generators between two terminals of the inductors 50.

Advantageously, the inductor has an inductance value able to vary within an interval in the range between 1 nanoHenry and 10 nanoHenrys. According to one embodiment, the inductance value is, for example, designed to be equal to 5 nanoHenrys.

The invention relates to an antenna array including two radiating elements each including a bundle or assembly of wire-like nanostructures. The bundles of the two radiating elements have their own respective capacitances. The inductor of each radiating element may be matched with the capacitance of the corresponding bundle, in other words, with the capacitance of the assembly of at least one wire-like nanostructure of the same radiating element.

Figure 8:
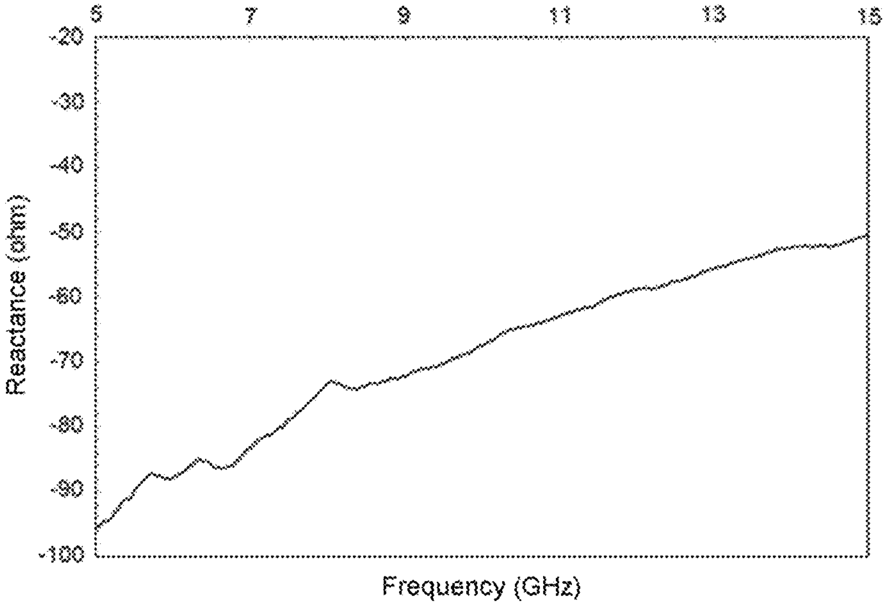
FIG. 8 shows a curve representing the reactance of a bundle of nanowire nanostructures as a function of frequency.

FIG. 8 shows schematically the variation of the reactance of a bundle of carbon nanotubes as a function of the frequency of a first electrical signal applied to it, for example between 7 and 13 GHz. The reactance varies as a function of frequency which means that the capacitance of this bundle also varies as a function of frequency. Consequently, by varying the voltage U1 in order to make the inductance value of the inductor 50 vary, the assembly of the resonant cell formed by the inductor 50 and a bundle F may be matched for several resonance frequencies. This allows an antenna to be obtained that emits or receives waves with a high gain at different frequencies hence exhibiting a behavior of a wide-band antenna or of an antenna tunable in frequency.

Figure 9:
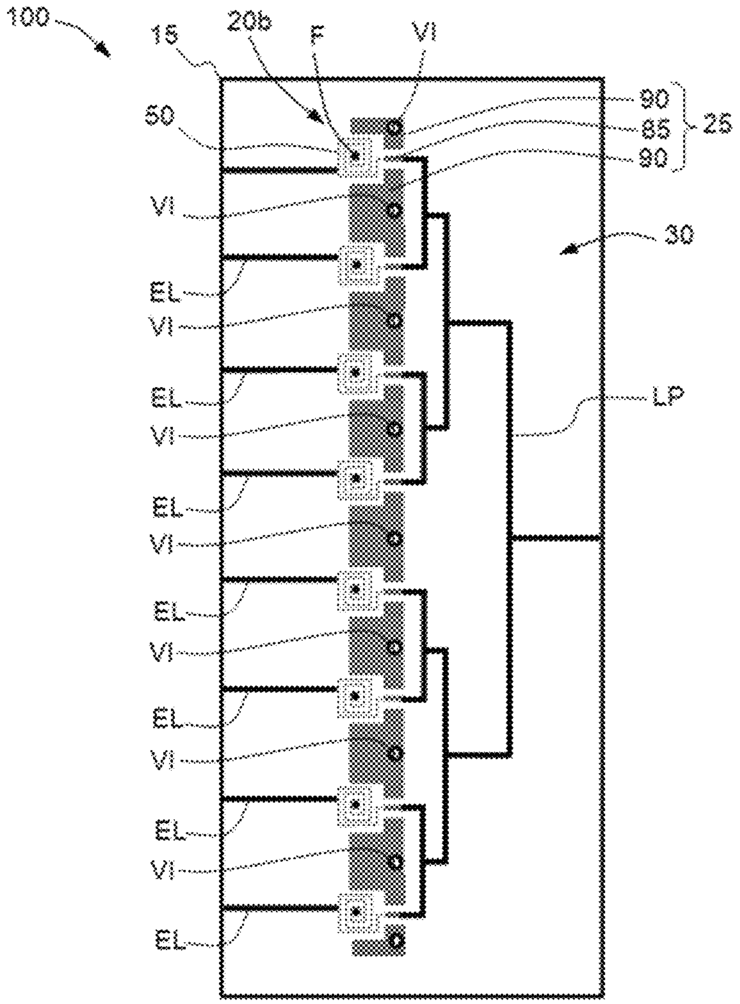
FIG. 9 shows a first embodiment of an antenna array including a one-dimensional array of radiating elements according to the second embodiment.

FIG. 9 shows an antenna array 100 including a one-dimensional array of radiating elements 20*b*, only one of which is referenced in FIG. 9 for the sake of clarity.

The radiating element 20*b* differs from that in FIG. 6 in that the electrode EL is coplanar with the inductor 50. As a variant, the electrode EL is deposited on the inductor 50 as in FIG. 6.

As a variant, the electrode may, in part, be deposited on the inductor 50 and, in part, be coplanar with the inductor 50.

Figure 10:
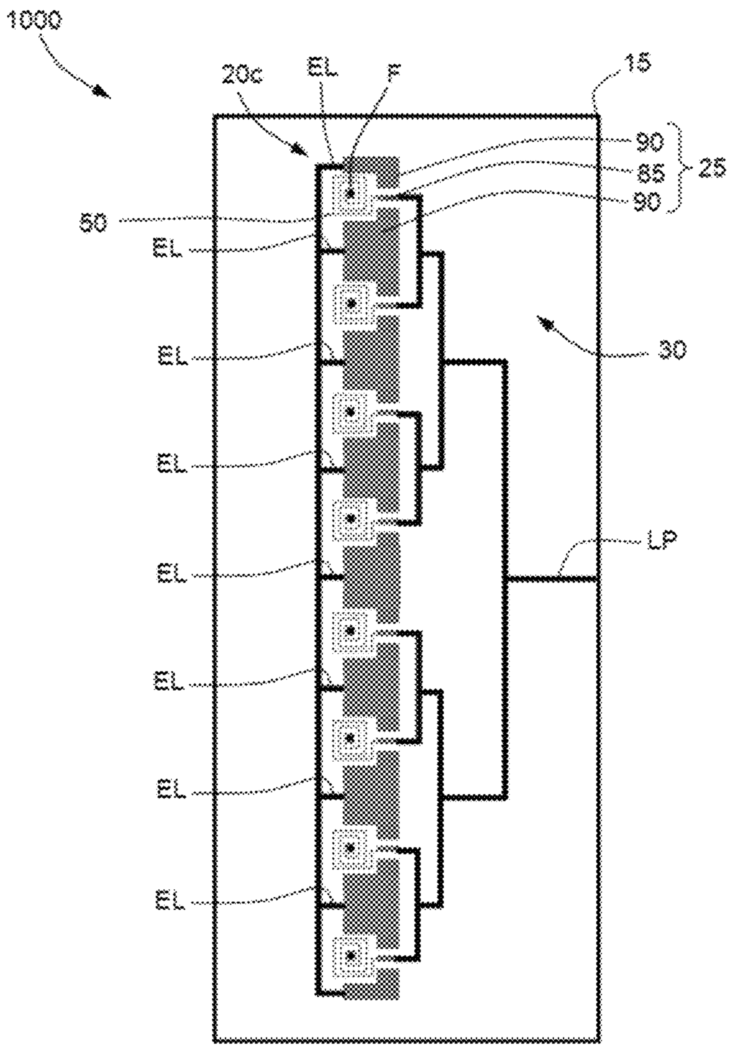
FIG. 10 shows a first embodiment of an antenna array including a one-dimensional array of radiating elements according to the second embodiment.

As a variant, like in the example in FIG. 10, the array could be two-dimensional. The antenna 100 includes a transmission line 25, such as previously described, for each radiating element 20*b*. The transmission lines 25 and, more particularly, the conducting regions 85 are electrically connected to a main transmission line LP allowing the first electrical current to be applied to each of the conducting regions 85.

The first electrical current is advantageously a radiofrequency signal.

The ground planes 90 are connected to a ground plane PC situated on the back face, in other words affixed to a face of the substrate 15 opposite to the carrier face 30.

The ground planes are, for example, connected to the ground plane PC via metallized holes VI.

The electrodes EL of each of the radiating elements 20*b* are, in part, deposited on the carrier face 30. The electrodes may be controlled collectively by the same variable DC voltage generator or independently by different generators.

When they are collectively controlled, the same electric field is applied within each inductance.

When they are controlled individually, it is possible to apply different electric fields adjustable independently and to obtain a frequency and/or impedance matching.

In another embodiment, the antenna may have radiating elements having bundles F with different capacitances and/or all with identical capacitances. The capacitance of each bundle is defined by its aspect ratio.

The antenna 1000 of the embodiment in FIG. 10 differs from that in FIG. 9 in that the electrodes EL are connected to the ground planes 90 of the radiating elements 20*c*. The radiating elements 20*c* differ from the radiating elements 20*b* in FIG. 9 in that they are lacking metallized holes.

The line LP allows a signal to be applied including, simultaneously, a radiofrequency signal and the DC voltage generating the electric field within the inductances 50, thus allowing the inductance value of the inductor 50 to be adjusted.

This solution allows the inductances 50 to be adjusted collectively.

The capacitance of a wire-like nanostructure depends on its aspect ratio. As a result, providing radiating elements having wire-like nanostructures with different aspect ratios allows radiating elements to be obtained that resonate at different frequencies and thus to emit and/or receive at several frequencies. An antenna composed of radiating elements which radiate at different frequencies may thus be formed. The antenna therefore has a behavior of a wide-band antenna.

The antenna has, for example, a first radiating element which has a wire-like nanostructure with a first aspect ratio and a second radiating element which has a nanostructure with a second aspect ratio.

Advantageously, the antenna has first means allowing the inductance value of the inductor of the first radiating element to be varied and second means allowing the value of the inductance of the second radiating element to be varied.

Advantageously, the antenna has first means allowing the inductance value of the inductor of the first radiating element to be varied independently of the inductance value of the second radiating element and second means allowing the value of the inductance of the second radiating element to be varied independently of the inductance of the first radiating element.

The first and second means advantageously each include a variable DC voltage generator.

Figure 11:
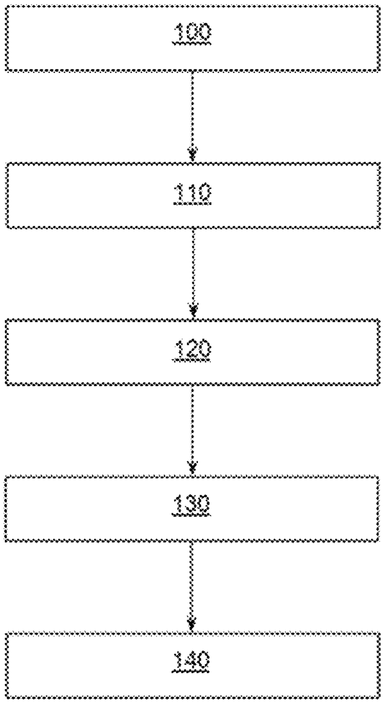
FIG. 11 is a flow diagram of the steps of a method for manufacturing a radiating element.

Such an antenna is furthermore readily manufactured, as is illustrated with reference to FIG. 11 which is a flow diagram of a method for manufacturing a radiating element 20.

The manufacturing method includes a supply step 100, a deposition step 110, an etching step 120, a placement step 130 and a growth step 140.

During the supply step 100, the substrate 15 is supplied.

During the deposition step 110, a layer of the first conductive material is deposited on the substrate 15.

When the material is graphene, the deposition is for example made by transfer in the vapor phase. A deposition by transfer comprises a step for exfoliating a layer of graphene from a block of graphite, during which a monolayer of carbon is extracted by using an adhesive ribbon and a step for thermal transfer of the atomic monolayer of carbon onto the substrate 15.

It should be noted that other deposition techniques may be envisioned.

During the etching step 120, the layer of the first conductive material is etched so as to form the inductor 50.

The etching step 120 comprises, for example, a photolithography step and/or a step for ion beam etching. Ion beam etching consists in projecting a beam of ions, notably of argon ions, onto the layer to be etched with a high energy so as to machine the layer to be etched.

It should be noted that other etching techniques for the layer of first conductive material may be envisioned.

During the placement step 130, a catalyzer C for the growth of nanostructures 45 is deposited onto the inductor 50.

The catalyzer C is a metal material. The catalyzers C the most often used for the growth of nanotubes or nanowires are nickel, cobalt, iron and gold. For example, the catalyzer C is iron. As a variant, the catalyzer C is composed of an alloy of at least two metals.

The catalyzer C takes, for example, the form of an assembly of nanoparticles.

The particles of the catalyzer C are nanoparticles. Preferably, each particle has three nanometric dimensions. For example, each dimension of each particle is strictly in the range of between 1 nanometer and 100 nanometers.

The particles of the catalyzer C are, for example, obtained by lithography. Lithography allows a perfectly periodic lattice of particles of the catalyzer C to be obtained.

As a variant, the particles are obtained by fragmentation and controlled de-wetting of a layer of catalyzer C deposited on the inductor 50.

According to another variant, the particles of the catalyzer C are obtained by spraying/atomization, onto the inductor 50, of a solution including these particles. As a variant, the particles are deposited by electrostatic grafting onto the inductor 50.

The preceding methods different from lithography allow a random lattice to be obtained for which the average distance between particles is controlled.

The particles are, for example, liquid when the catalyzer C is at the setpoint temperature Tc. This is for example the case of silicon nanowires whose growth is catalyzed by means of particles of gold. As a variant, the particles are solid when the catalyzer C is at the setpoint temperature Tc. This is for example the case of the growth of carbon nanotubes.

As a variant, the catalyzer C forms a uniform layer.

During the placement step 130, the catalyzer C is deposited in such a manner as to form a layer having, in a plane perpendicular to the normal direction Z, a shape identical to the shape of the cross-section of the bundle F.

It should be noted that, in certain cases, it may be envisioned not to use any catalyzer.

This is for example the case for certain types of nanostructures. It may then be envisioned to replace the step 130 for placement of a catalyzer C by a step for depositing a layer preventing the growth of nanostructures elsewhere other than on the inductor 50.

For example, this step for depositing a layer preventing the growth includes an etching step during which an opening is formed on the inductor 50 in the layer preventing the growth in order to allow the growth of a bundle F of nanostructures 45.

During the growth step 140, at least one nanostructure 45 is obtained. In particular, the nanostructures 45 grow on the inductor 50 so as to form a bundle F.

According to one embodiment, a nanostructure 45 is obtained for each particle of catalyzer C.

The nanostructures 45 are, for example, obtained by chemical vapor deposition. Chemical vapor deposition (commonly denoted by the acronym CVD) is a technique frequently used for depositing a material on a substrate. Chemical vapor deposition is carried out in a closed vessel, bounding a chamber isolated from the outside atmosphere and containing at least one substrate, in general held at a high temperature. A gas called "precursor" is injected into the vessel and is decomposed upon contact with the heated substrate, liberating on the substrate of the atoms of one or more predetermined elements.

The liberated atoms form chemical bonds between them leading to the formation, on the substrate, of the desired material.

The thermal chemical vapor deposition process is a technique in which the substrate 15 is heated to a high temperature of the order of 600 degrees Celsius or more and is a type of CVD particularly adapted to the growth of carbon nanotubes.

According to one embodiment, during the growth by chemical vapor deposition, a plasma is generated in the growth chamber.

Several radiating elements 20 are fabricated simultaneously. For example, during the etching step 120, the inductors 50 of several radiating elements are formed. During the positioning step 130, a catalyzer C is deposited onto each inductor 50. During the growth step 140, at least one nanostructure 45 is formed on each inductor 50.

It should be noted that the manufacturing method could also include the fabrication of each transmission line 25. For example, each transmission line 25 is formed, in the layer of first conductive material, during the etching step 120.

According to one variant, when the second conductive material is not identical to the first conductive material, the manufacturing method comprises a step for depositing a layer of the second conductive material and a step for etching the layer of second conductive material in order to form the transmission lines 25.

The method for manufacturing the radiating elements 10 is simple.

Molybdenum is a material which withstands well the conditions prevailing in a nanostructure growth system 45, in particular a CVD system. The inductor 50 and the transmission lines 25 are not therefore degraded during the growth of the nanostructures 45, in particular when the nanostructures 45 are carbon nanotubes.

Sputtering is a deposition method allowing layers of molybdenum of good quality to be obtained.

The method may comprise a step for depositing one or more electrodes.

The electrodes are formed in a conductive material, for example molybdenum.

The step for depositing an electrode comprises the deposition of the layer of molybdenum by sputtering.

Sputtering is a technique for depositing thin layers in which a target made of the material to be deposited is provided, generally in the form of solid material, in a deposition chamber and a plasma is formed in a low-pressure gas present in the deposition chamber. The application of a potential difference between the target and the walls of the deposition chamber causes a bombardment of the target by positive electrically charged species in the plasma. The bombardment leads to the sputtering of the target and thus the release into the deposition chamber of atoms of the material to be deposited. The condensation of the atoms thus released onto a substrate then forms a layer of the material to be deposited.

The invention claimed is:

1. A radiating element for an antenna including:

an assembly comprising at least one wire-like nanostructure, each wire-like nanostructure of the assembly having a first end and a second end, each wire-like nanostructure of the assembly extending in a same common direction, between the first end and the second end, and an inductor connected to the first end of each wire-like nanostructure of the assembly, the inductor being formed from a first conductive material, and the inductor extending in a plane normal to the common direction, the first conductive material having an electrical conductivity varying under the effect of a variation of an electric field applied within the first conductive material.

2. The radiating element as claimed in claim 1, wherein the inductor is configured to have an inductance value being able to be matched with a capacitance value of the assembly of at least one wire-like nanostructure.

3. The radiating element as claimed in claim 1, wherein the first conductive material includes a semi-metal.

4. The radiating element as claimed in claim 1, wherein the first conductive material comprises a graphene.

5. The radiating element as claimed in claim 1, wherein the first conductive material is a transition metal dichalcogenide.

6. The radiating element as claimed in claim 1, wherein said at least one wire-like nanostructure is a carbon nanotube.

7. The radiating element as claimed in claim 1, wherein the inductor has a spiral shape.

8. The radiating element as claimed in claim 1, wherein the assembly of at least one wire-like nanostructure includes several wire-like nanostructures.

9. The radiating element as claimed in claim 8, wherein the inductor is configured so as to have an inductance value that may be matched with a capacitance of the assembly of wire-like nanostructures.

10. An elementary antenna including:

the radiating element as claimed in claim 1, and a transmission line including a region made of a second conductive material and two ground planes, the transmission line extending in the same plane as the inductor and the region being connected to the inductor, each ground plane being made of a third conductive material, the region being arranged between the two ground planes and, a variable direct current (DC) voltage generator allowing a DC voltage being applied between two terminals of the inductor so as to apply an electric field within the first conductive material.

11. The elementary antenna as claimed in claim 10, including an electrode in physical contact with the inductance, and the variable DC voltage generator applying the electric field within the first conductive material by means of the electrode.

12. An antenna array including an array of several radiating elements having a plurality of elementary antennas as claimed in claim 10.

13. The antenna array as claimed in claim 12, the plurality of elementary antennas including a first elementary antenna and a second elementary antenna having radiating elements having assemblies of at least one wire-like nanostructure with different capacitances.

* * * * *